United States Patent

[11] 3,590,259

| [72] | Inventors | Russel R. Johnston<br>Los Angeles, Calif.;<br>Louis Bucalos, Holbrook, N.Y. |
|---|---|---|
| [21] | Appl. No. | 41,662 |
| [22] | Filed | Apr. 20, 1970 |
| [45] | Patented | June 29, 1971 |
| [73] | Assignee | Kinemotive Corporation<br>Farmingdale, N.Y.<br>Continuation of application Ser. No.<br>623,763, Mar. 16, 1967, now abandoned. |

[54] CHOPPER STABILIZED PHOTOELECTRIC TRANSDUCER
15 Claims, 8 Drawing Figs.

[52] U.S. Cl. ........................................... 250/231,
250/205, 250/220, 250/233
[51] Int. Cl. .............................................. G01d 5/34
[50] Field of Search........................................ 250/231,
205, 220, 220 C, 232, 233, 236, 207, 217; 356/230

[56] References Cited
UNITED STATES PATENTS

| 2,141,175 | 12/1938 | Dawson | 250/231 X |
| 2,517,154 | 8/1950 | Frommer | 250/233 X |
| 2,958,786 | 11/1960 | Millis | 250/231 X |
| 3,093,743 | 6/1963 | Inderwiesen | 250/232 |
| 3,127,464 | 3/1964 | Gustavson | 250/233 |
| 3,213,377 | 10/1965 | Neale | 250/233 X |
| 3,282,149 | 11/1966 | Shaw et al | 250/205 X |
| 3,354,320 | 11/1967 | McLaughlan | 250/232 |
| 2,548,755 | 4/1951 | Vossberg et al. | 250/217 X |
| 3,100,997 | 8/1963 | Lorenz | 250/231 X |
| 3,416,865 | 12/1968 | Townsend | 250/231 X |

FOREIGN PATENTS

| 834,021 | 5/1960 | Great Britain | 250/232 |

*Primary Examiner*—Walter Stolwein
*Attorney*—Allan M. Shapiro

ABSTRACT: A photoelectric transducer having two paths for light from a single light source to a single photosensor, one path having a shutter coupled to the object whose displacement is to be measured for sensed attenuation of the light in that path, and one path having a chopper mechanism for periodically interrupting the light in that path to provide an AC component. The light from one path causes the photosensor to produce a sensed signal component, while the light from one or both paths causes the photosensor to produce a control signal component or components for use in a control circuit to vary the amplitude of the light emitted from the light source to stabilize the performance of the transducer at a constant value.

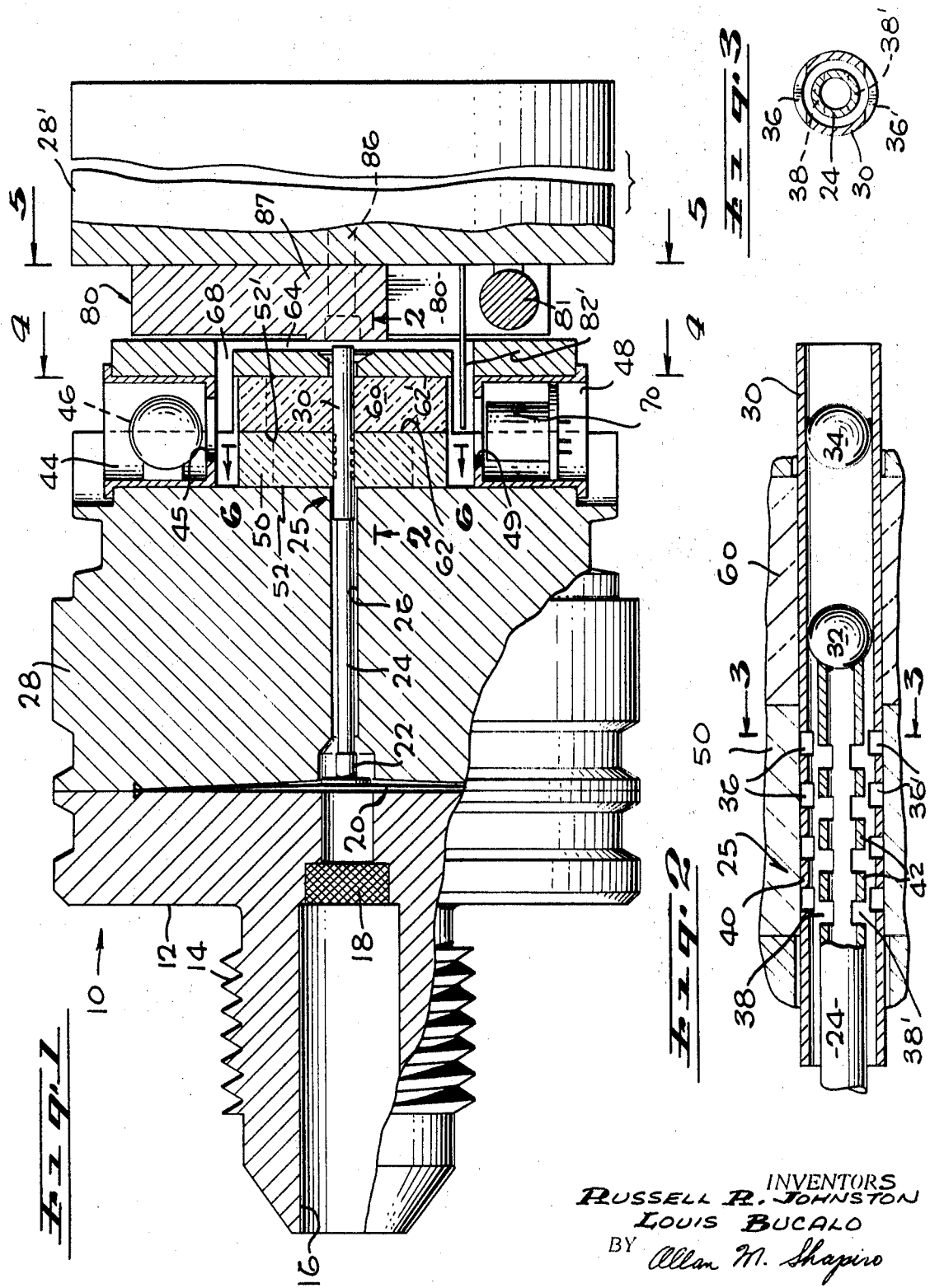

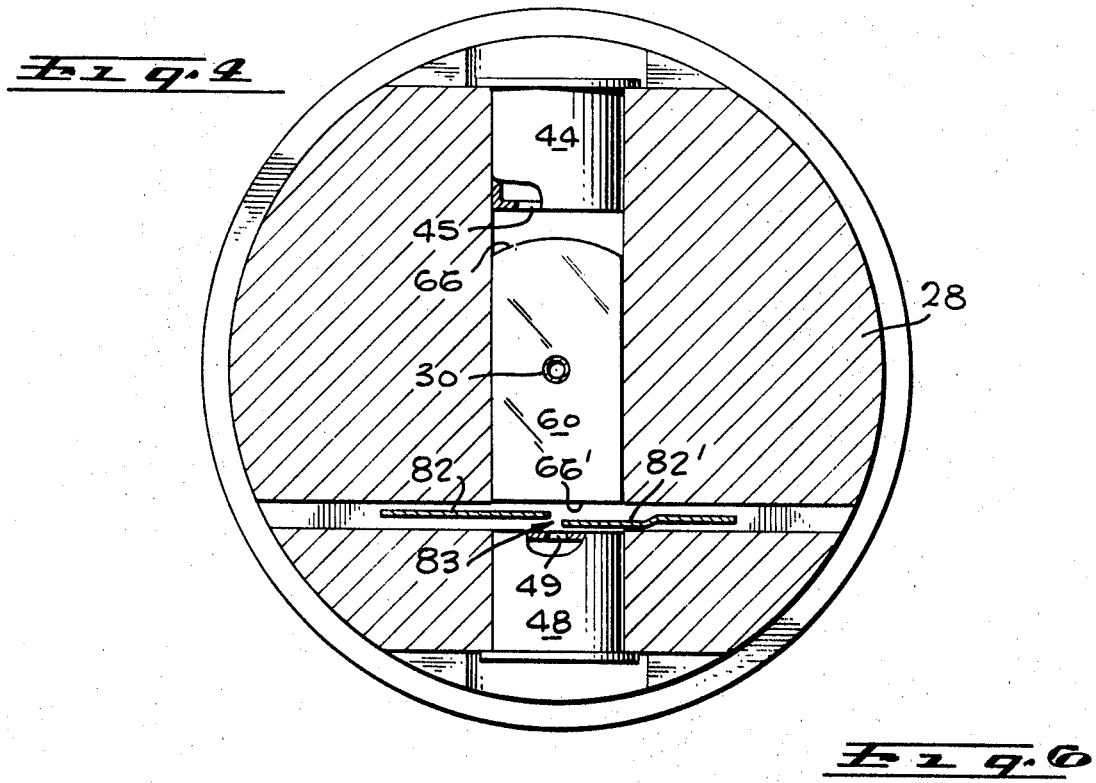
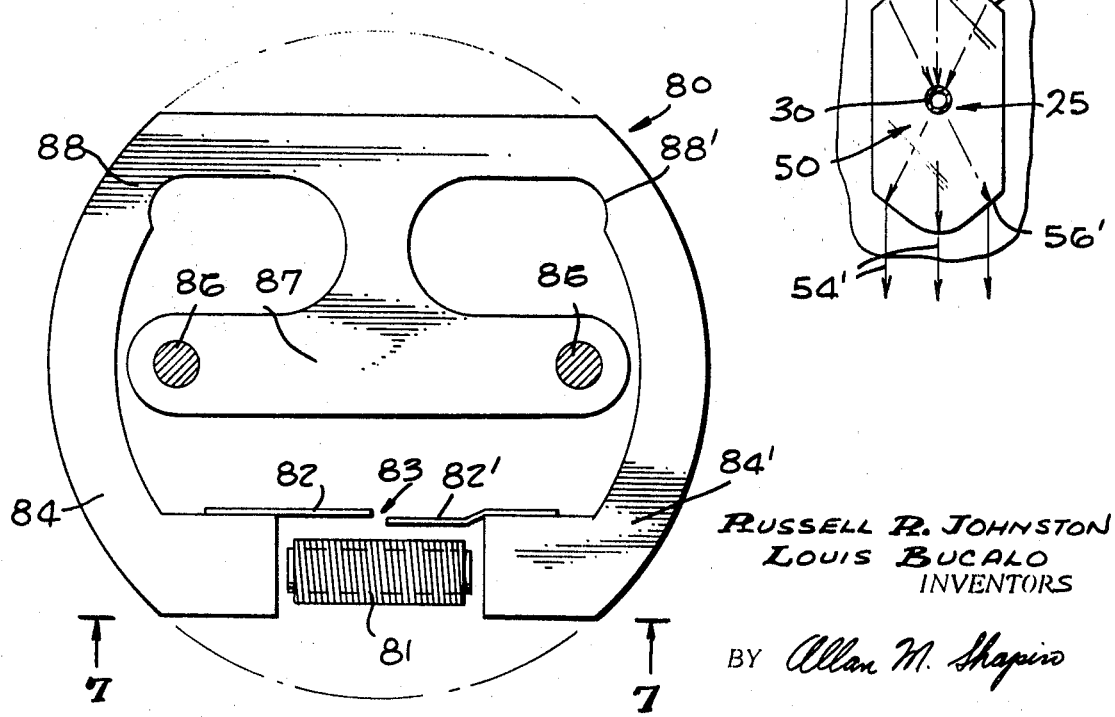

CHOPPER STABILIZED PHOTOELECTRIC TRANSDUCER

This is a continuation of Ser. No. 623,763, filed Mar. 16, 1967, now abandoned.

BACKGROUND OF THE INVENTION

1. Field of the Invention

This invention relates to a photoelectric transducer for producing an electrical output indicative of a mechanical displacement. More particularly, the invention relates to a chopper stabilized transducer providing inherent self-compensation to minimize variations in performance due to changes in lamp brightness or photosensor sensitivity.

2. Description of the Prior Art

A photoelectric transducer is a device which translates a mechanical motion into an electrical signal indicative of that motion, by causing the mechanical motion to vary the amount of light (from an appropriate source) incident on a photosensor. Such devices are described, for example, in the article by Russell Johnston entitled "Photoelectric Transducers" which may be found on pages 111 to 112 of the March, 1966 issue of the magazine Instruments and Control Systems.

The major disadvantage of photoelectric transducers is that their accuracy is adversely affected by variations in environmental temperature, lamp aging, and/or photosensor aging. Should the brightness of the lamp or the sensitivity of the photosensor change (due to aging or temperature variation), a concurrent variation in the output voltage will occur. Unless compensated for, this will result in an erroneous measurement.

One technique for compensating for variations in light brightness or photosensor sensitivity involves the use of two photosensors, both of which receive the shutter modulated light. The output current of the two sensors is summed and, by using a feedback circuit, the intensity of the light source is varied in such a way that this sum is held constant. Since the signal generated by the shutter is differential, it does not affect the feedback, nor is it affected by the feedback. The major disadvantage of this technique is that it presupposes identical sensors, i.e., sensors that age identically and respond identically to variations in temperature or light intensity.

The chopper stabilized photoelectric transducer which forms the subject matter of this invention provides inherent self-compensation for variations in the brightness of the transducer light source or changes in the sensitivity of the photosensor. Moreover, the inventive transducer utilizes only one photosensor, thus eliminating a problem associated with earlier stabilization schemes requiring identical photosensors, and providing for a less expensive unit.

SUMMARY OF THE INVENTION

The inventive chopper-stabilized photosensor described herein comprises a single light source and photosensor. Light from the source is divided into two beams, one of which passes through a shutter, and the other of which is periodically interrupted by a mechanical chopper. Both light beams are incident on the photosensor, the output of which contains a DC component indicative of the displacement of the shutter, and an AC component, the magnitude of which is indicative of the brightness of the source and the sensitivity of the photosensor. A control circuit utilizes this AC component to control the brightness of the source, and thus to compensate for variations in lamp brightness or photosensor sensitivity due, e.g., to aging or environmental temperature variation.

It is thus an object of this invention to provide a photoelectric transducer capable of error-free operation despite variations in light source brightness or photosensor sensitivity.

It is another object of this invention to provide a stabilized photoelectric transducer which utilizes only one photosensor.

It is yet another object of this invention to provide a photoelectric transducer wherein a chopper mechanism is used to provide a photosensor AC output component indicative of the brightness of the light source and the sensitivity of the photosensor.

A further object of this invention is to provide a photoelectric transducer including a single photosensor having a DC output component indicative of a mechanical displacement and an AC output component indicative of the brightness of the light source and the sensitivity of the photosensor.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is an elevational view, partly broken away and in section, of a typical pressure sensor including the inventive chopper stabilized photoelectric transducer;

FIG. 2 is an enlarged fragmentary sectional view, partly in elevation, of a shutter which may be employed as part of the inventive transducer, as seen substantially along the line 2-2 of FIG. 1;

FIG. 3 is an enlarged sectional view of the shutter as seen substantially along the line 3-3 of FIG. 2;

FIG. 4 is an elevation view, partly in section, of the chopper and lens components of the inventive photoelectric transducer, as seen substantially along the line 4-4 of FIG. 1;

FIG. 5 is an elevation view, partly in section, of a typical chopper mechanism such as may be employed as part of the inventive photoelectric transducer, as seen substantially along the line 5-5 of FIG. 1;

FIG. 6 is a fragmentary elevation view, partly in section, of a lens which may be employed as part of the inventive photoelectric transducer, as seen substantially along the line 6-6 of FIG. 1;

DESCRIPTION OF THE PREFERRED EMBODIMENT

Figure 7:
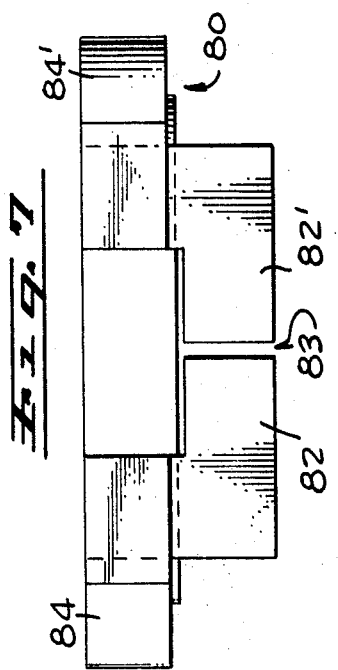
FIG. 7 is an elevation view showing the vanes of the chopper mechanism, as seen substantially along the line 7-7 of FIG. 5.

The inventive chopper stabilized photoelectric transducer may be used in any application wherein it is desired to convert or translate a mechanical motion or displacement into an electrical signal indicative of that motion or displacement. To illustrate the operation and application of the transducer, the invention is described hereinbelow as it may be utilized in a pressure sensor useful for measuring the pressure of a gas or liquid.

Referring to FIG. 1, there is shown an elevation view of a preferred embodiment of the inventive chopper stabilized photoelectric transducer, as utilized in a typical pressure sensor. Pressure sensor 10 includes a pressure port 12 adapted for coupling to a hydraulic or pneumatic system (not shown in the drawings and not a part of this invention) in which it is desired to measure fluid pressure. In the typical embodiment illustrated in FIG. 1, pressure port 12 includes external threading 14 to facilitate connection to the associated system; however, other coupling means, such as a female port with internal threading, may be employed.

The pressure fluid which is to be measured enters a pressure port 12 via a passageway 16 and impinges on a diaphragm 20. The filter 18, in passageway 16, may be employed to remove particles from the fluid; if not filtered, these particles might lodge in the space adjacent to, and impede the free motion of, the diaphragm 20. The diaphragm 20, preferably circular in shape, is connected at its center via a hat-shaped coupling 22 to a coaxial shutter tube 24. The shutter tube 24 is free to move coaxially in a tubular passageway 26, which passageway is concentric with a circular housing 28. The shutter tube 24 will be axially displaced by an amount proportional to the pressure exerted on the diaphragm 20 by the gas or liquid whose pressure is being measured.

As illustrated most clearly in FIGS. 2 and 3, the free end of the shutter tube 24 is connected to a solid ball 32. In a preferred embodiment, the ball 32 has a diameter slightly larger than the diameter of the shutter tube 24 and is substantially equal in diameter to the inside diameter of a slit tube 30. This allows the shutter tube 24 and ball 32 to move freely coaxially with the slit tube 30, but prevents the shutter tube 24 from experiencing transverse motion with respect to the slit tube 30. A ball 34, rigidly fixed to the inside of the slit tube 30, serves as a pressure seal. The shutter tube 24 and slit tube 30 together form a shutter referenced generally at 25.

The slit tube 30 contains a plurality of slits 36 and 36', disposed in diametrically opposing pairs, through which light may pass. The shutter tube 24 also contains a corresponding plurality of slits 38 and 38' disposed in pairs on diametrically opposite sides of the tube 24. In a preferred embodiment, the width of the slits 36 and 36' is the same as the width of slits 38 and 38', and the width of the segments 40 between the slits 36 and 36' is equal to the width of the segments 42 between shutter slits 38 or 38'. With this arrangement, light entering one side of the slit tube 30, as via slits 36, for example, may pass through slits 38 and 38' in the shutter tube 24, and out of the slit tube 30 via slits 36'.

The amount of light passing through the shutter 25 will depend on the relative axial position of the inner shutter tube 24 with respect to the coaxial outer slit tube 30. For example, if the shutter tube 24 were located so that its segments 42 were aligned with the slits 36 and 36' of the slit tube 30, essentially no light would be passed by the shutter 25. Conversely, if the shutter tube 24 were so positioned that its slits 38 and 38' respectively were aligned with the outer slits 36 and 36', essentially all light incident on slits 36 would be transmitted through the shutter 25. Intermediate these two extremes, the attenuation of light by the shutter 25 essentially is proportional to the relative axial location of the shutter tube 24 with respect to the slit tube 30. Since the axial location of the shutter tube 24 is determined by the displacement of the diaphragm 20, the amount of light attenuated by the shutter 25 will be indicative of the pressure exerted on the diaphragm 20 by the fluid being measured.

Referring again to FIG. 1, the pressure sensor 10 includes a housing portion 44 wherein is situated a suitable light source 46 which, for example, may be an incandescent bulb or a light emitting diode such as a gallium arsenide diode. Pressure sensor 10 also includes a second housing portion 48 wherein is located a photosensor such as a phototransistor indicated generally at 70. In a preferred embodiment, light from source 46 will pass through an aperture 45 in its housing 44 and be effectively divided into two beams or paths, the first beam passing through a first lens 50, the second beam passing through a second lens 60 parallel to the first lens 50. Both light beams then pass through an aperture 49 in housing portion 48 and are incident on the phototransistor 70. As will be explained in greater detail hereinbelow, the light beam which passes through lens 50 is attenuated by the shutter 25 and results in a DC output from the phototransistor 70 indicative of the pressure exerted on the diaphragm 20. The light beam which passes through lens 60 does not traverse the shutter 25, but is periodically interrupted by chopper vanes 82 and 82'. This chopped light beam results in an AC output from the phototransistor 70.

The shape and function of lens 50 is best described in conjunction with FIGS. 1 and 6. In a preferred embodiment, lens 50 may be made of glass or transparent plastic and includes flat parallel faces 52 and 52'. The slit tube 30 of the shutter 25 passes through the lens 50 via an appropriate hole located in the center of the lens. A light-receiving surface 56 of lens 50 is so shaped that light rays 54 from the light source 46 will be focused approximately at the longitudinal axis of the slit tube 30. Similarly, a light-emerging lens surface 56' is so curved or configured that light focused at the axis of the slit tube 30 will emerge from the lens 50 as approximately collimated rays 54'. As noted earlier, the light 54' emerging from the lens 50 is incident on the phototransistor 70. Since the lens surfaces 56 and 56' each are focused at the axis of slit tube 30, essentially all of the light passing through the lens 50 will be attenuated by the shutter 25.

The shape and function of the second lens 60 and its associated chopper mechanism 80 may best be understood by reference to FIGS. 1 and 4; for clarity, no hidden lines are shown in FIG. 4. Lens 60, which may be made of glass or transparent plastic, has flat parallel surfaces 62 and 62'. In the embodiment illustrated in FIG. 1, surface 62 of lens 60 abuts against surface 52' of lens 50. To prevent light from passing between lenses 50 and 60, surface 62 of lens 60 may be covered with a layer or film (not shown) of light absorbing material such as black paint. Respective light-receiving and light-emerging surfaces 66 and 66' of lens 60 have configurations such that light entering the lens from light source 46 will be focused in the plane of chopper vanes 82 and 82'. While a portion of the slit outer tube 30 may extend through the center of lens 60, slit tube 30 causes negligible attenuation of light passing through lens 60 since it is not situated neat the focus of the lens and, in any event, is an optically constant value so as not to interfere with the operation. Light focused by lens 60 is interrupted periodically by chopper vanes 82 and 82' (in a manner described more fully hereinbelow) and is incident on phototransistor 70.

Operation of the illustrative embodiment of chopper mechanism 80 may be understood further by reference to FIGS. 1, 4, 5 and 7. As best illustrated in FIG. 5, the chopper mechanism 80 comprises a unitary member 87 including arm portions 84 and 84' which are free to flex (in the plane of member 87) about respective fulcrum regions 88 and 88'. Member 87 is rigidly secured to housing 28 of pressure sensor 10 at locations 86. An electromagnet 81, the power of which is supplied by an AC source (not shown), is employed to cause flexure of arm portions 84 and 84'. In a preferred embodiment, the frequency of the AC signal applied to electromagnet 81 is approximately equal to the natural resonant frequency of flexure of arm portions 84 and 84', thus minimizing the amount of energy necessary to drive chopper mechanism 80. Such AC signal may be derived from an AC signal of the photosensor itself.

Chopper vanes 82 and 82' are attached to respective arm portions 84 and 84' and are situated in the focal plane of lens 60. Chopper vanes 82 and 82' are offset slightly from one another so that when arm portions 84 and 84' flex toward one another, under the attraction of energized electromagnet 81, vanes 82 and 82' will slightly overlap. This will interrupt the light beam emerging from lens 60. When arm portions 84 and 84; flex away from one another, chopper vanes 82 and 82; separate sufficiently to allow light focused by lens 60 to pass therebetween and to be incident on phototransistor 70. As a result, the light beam focused by lens 60 is interrupted periodically at a rate approximately the frequency of the AC voltage applied to electromagnet 81. By locating the chopper vanes in the focal plane of lens 60, it is possible to use vanes having a smaller separation than would be required if not situated in a focal plane. Also, the effect of a focal plane chopper is to change the light intensity incident on the photosensor, rather than just to cast a shadow. It thus will be readily understood that, as used herein, the term "focal plane" includes the preferred condition wherein the light is focused at and along the longitudinal slot region, indicated generally at 83, defined by the parallel opposed edges of the vanes 82 and 82' at their extreme oscillatory separation position. The term also includes the condition wherein the vanes 82 and 82' are located so close to the aperture 49 of the photosensor housing portion 48 that the aperture 49 effectively resides in the focal plane, and the portion of the aperture 49 opposing the lens 60 is only a slit at which the lens 60 focuses its light beam, such slit being slightly narrower than the maximum opening provided by the vanes 82 and 82' whereby the amplitude of the AC signal is not affected by small variations in the maximum excursions of the chopper vanes.

Alternate embodiments of chopper mechanism 80 may be employed in place of the vibrating vane embodiment illustrated in the drawings. For example, chopper mechanism 80 may be replaced by a motor mounted in cylindrical housing 28' with a disc rotatable in region 64, and a slotted annular flange on the disc which would rotate in cylindrical passageway 68 for periodically interrupting the light path of lens 60.

As described hereinabove, two light beams will be incident on phototransistor 70. The first beam, which passes through the first lens 50 and the shutter 25, will result in a DC output component from phototransistor 70; this DC component is indicative of the axial displacement of the inner shutter tube 24 relative to the outer slit tube 30 in the shutter 25. The second beam, which passes through the second lens 60 and is periodically interrupted by the chopper mechanism 80, will result in an AC output component from transistor 70. The magnitude of this AC component is indicative of the brightness of lamp 46 and the sensitivity of phototransistor 70. Since variations in the brightness of lamp 46 or the sensitivity of phototransistor 70 equally affect the AC and DC components of the output of phototransistor 70, error-free transducer operation will result when the magnitude of the AC component is stabilized at a constant value.

Figure 8:
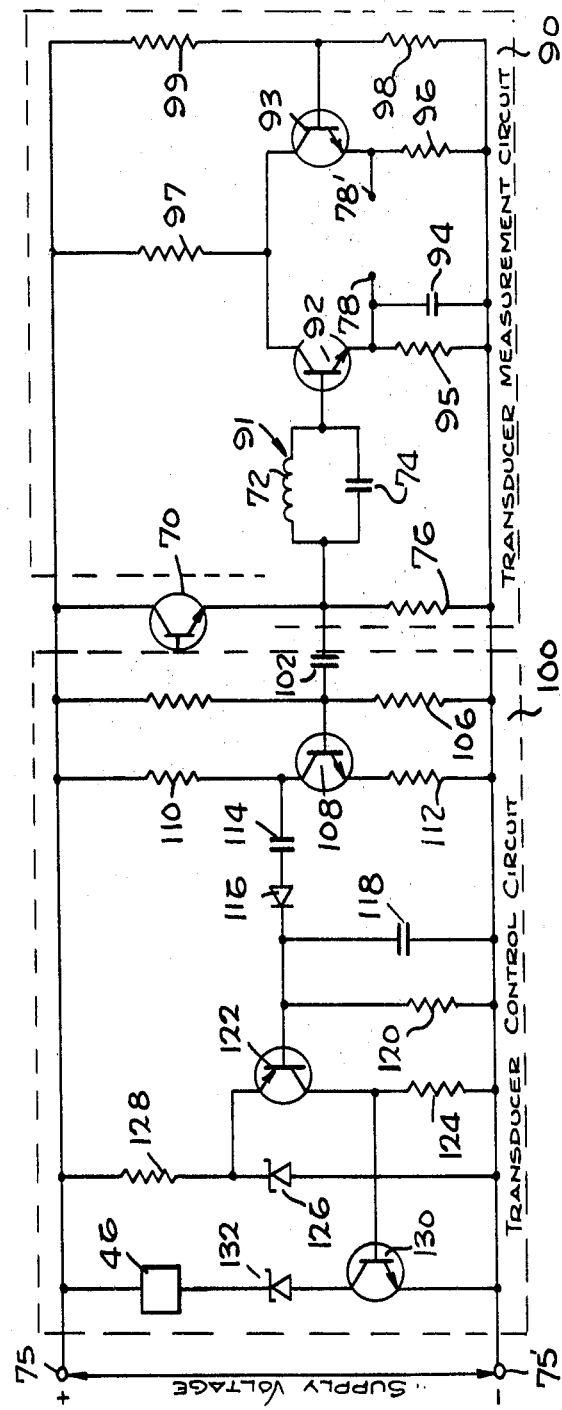
FIG. 8 is a schematic diagram of a typical electrical circuit which may be employed as part of the inventive chopper stabilized photoelectric transducer.

FIG. 8 is a schematic diagram of a typical embodiment of the electrical circuitry associated with the inventive chopper-stabilized photoelectric transducer. As shown in FIG. 8, transducer measurement circuit 90 is responsive to the DC output level of phototransistor 70 and produces an output voltage between terminals 78 and 78' which is proportional in amplitude to the displacement of diaphragm 20. Transducer control circuit 100 (also shown in FIG. 8) is responsive to the AC output component of phototransistor 70, and controls the intensity of light source 46 in response thereto. Transducer control circuit 100 operates to maintain the AC output component at a constant level.

Referring to FIG. 8, a DC supply voltage (connected at terminals 75 and 75') is applied across the collector and emitter of phototransistor 70 via resistor 76. In transducer measurement circuit 90, the DC component from phototransistor 70 is separated from the AC component by the action of filter 91. Filter 91, including capacitor 74 and inductor 72, comprises a parallel circuit resonant at the light interruption frequency of chopper mechanism 80. Capacitor 94 serves to filter out any residual AC component from phototransistor 70 which is not eliminated by filter 91.

Transistors 92 and 93 and resistors 95, 96, 97, 98 and 99 together form a dual emitter follower which provides a low impedance output across terminals 78 and 78'. Note that the voltage at the emitter of transistor 93 is independent of the output of phototransistor 70 and essentially is determined by the values of resistors 96, 97, 98 and 99. The voltage level at the emitter of transistor 92 is proportional to the DC output component of phototransistor 70. Thus, the differential voltage between the emitters of transistors 92 and 93 (i.e., the output voltage across terminals 78 and 78') is proportional to the displacement of diaphragm 20. In a preferred embodiment, the bias level of transistor 93 is selected so that the voltage level across output terminals 78 and 78' will be zero when the shutter 25 is at its maximum attenuation setting. Note that if transistors 92 and 93 are selected to have similar temperature characteristics, then, for a given setting of shutter 25, the output across terminals 78 and 78' will remain constant regardless of changes in the ambient temperature of these transistors.

Transducer control circuit 100 functions to insure that a constant DC output level will be obtained from phototransistor 70 (and hence from transducer measurement circuit 90) for a given setting of shutter 25, despite changes in the performance of the various transducer components. This is accomplished by comparing the magnitude of the AC component in the output of phototransistor 70 with a fixed reference voltage. Any variation in the magnitude of the AC component is sensed and used to control the brightness of lamp 46 so as to compensate for the sensed variation. Since changes in the brightness of lamp 46 or in the sensitivity of phototransistor 70 equally effect the AC and DC output components of phototransistor 70, maintaining the AC component at a constant level insures that the DC component, and hence the output of transducer measurement circuit 90, will be maintained at a correct level.

As shown in FIG. 8, the AC output component of phototransistor 70 is isolated from the DC component by capacitor 102 and is fed to the base of transistor 108. Transistor 108 and resistors 104, 106, 110 and 112 form a circuit which amplifies the AC component by an amount determined essentially by the ratio of the values of resistor 110 and 112. The amplified AC signal is fed via capacitor 114 to a halfwave rectifier circuit comprising diode 116, resistor 120 and capacitor 118.

Resistor 128 and Zener diode 126 form a voltage divider that establishes a constant reference voltage at the emitter of transistor 122. The collector current (and hence the current flowing through resistor 124) is proportional to the difference between the reference voltage at the emitter of transistor 122 and the voltage across capacitor 118. The current at the collector of transistor 122 is amplified by transistor 130 to control the current through, and hence the brightness of, lamp 46. Zener diode 132 serves to drop the voltage to a level appropriate for transistor 130, since the voltage drop across lamp 46 may be on the order of 1 or 2 volts, while the supply voltage (applied across terminals 75 and 75') may be in the order of 28 volts.

The operation of transducer control circuit 100 may be understood by way of the following example. Should the brightness of lamp 46 decrease, because of aging effects, the level of the chopped light entering phototransistor 70 via lens 60 and chopper mechanism 80 will decrease correspondingly. This will cause a reduction in the magnitude of the AC component of the output from phototransistor 70, and a concomitant decrease in the rectified DC voltage across capacitor 118. The difference in voltage between the reference voltage at the emitter of transistor 122 and the voltage across capacitor 118 will thus increase, causing an increase in collector current in transistor 122. This current will be amplified by transistor 130, and increased current will flow in lamp 46, thus increasing its brightness. This increase in brightness of lamp 46 will compensate for the decrease in brightness due to aging, and will be sufficient to maintain the magnitude of the AC component at a constant level.

Should the sensitivity of phototransistor 70 increase, for example, due to a change in environmental temperature, the AC and DC output components of phototransistor 70 also will increase, even though the brightness of lamp 46 may be unchanged. In this case, the increase in magnitude of the AC output component will cause a corresponding increase in the voltage level across capacitor 118. The difference in voltage between the reference voltage at the emitter of transistor 122 and the voltage across capacitor 118 will decrease, causing a decrease in the current amplified by transistor 130. This in turn will reduce the current through, and hence the brightness of, lamp 46, so as to compensate for the increased sensitivity of phototransistor 70.

Note that in either of the examples given immediately above, if no chopper stabilization had been employed, erroneous pressure measurements would have been obtained using pressure sensor 10. For example, for a given pressure and normal light output from light source 46, the output voltage across terminals 78 and 78' may be $V_p$. Should the brightness of lamp 46 be reduced, because of aging, the actual voltage appearing across the output terminals in the absence of chopper stabilization would be less than $V_p$. This lower output voltage in turn might be interpreted erroneously as meaning that a pressure existed which was lower than the actual pressure being sensed. However, by employing the inventive chopper-stabilized photoelectric transducer, the decrease in brightness of lamp 46 would automatically be compensated for (by operation of transducer control circuit 100 which would cause a compensating increase in the brightness of lamp 46), and the voltage measured across terminals would in fact be $V_p$, the correct value. Similarly, correct transducer measurements would be obtained despite other parameter variations (such as temperature effects) which otherwise might result in erroneous measurement.

While in the embodiment illustrated the AC output component of phototransistor 70 is used to control the brightness of lamp 46, it should be evident to one skilled in the art that other compensation techniques may be used which also employ the AC component from the phototransistor 70. For example, the AC component could be used to control the sensitivity of the photosensor directly.

While the foregoing disclosure of a preferred embodiment in accordance with the present invention will serve to teach those having ordinary skill in the art how to practice this invention, it is desired to point out certain variable and additional features which provide and even broader flexibility and range of characteristics which are advantageous in some applications. FOr example, employing the same structural configuration as described hereinabove, the light source itself, which may be a gallium arsenide diode, for example, may be initially modulated by a radio frequency modulation means of any suitable type whereby the emitted light constitutes and RF carrier. Thus, the photosensor receives and translates an RF carrier with audio frequency modulation thereof by the chopper means in the control signal light path, and receives and translates and RF carrier with displacement signal amplitude variation or modulation thereof by the shutter means in the signal path. Appropriate treatment of the photosensor output provides the desired displacement and compensation control signals, as by means for detection, demodulation or filtering.

As a further example, the variable aperture portion of the shutter means may be disposed in the same light path as that modulated by the chopper means. Thus, with a constant light source, there is provided a light path for obtaining a DC amplitude control and reference signal and another light path for obtaining an AC signal by the chopper means which is amplitude modulated by the sensed variations of the shutter means. By employing a narrow band-pass filter to detect the modulated AC signal, noise variations can be substantially eliminated and an improved signal-to-noise ratio can be obtained.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A chopper stabilized apparatus adapted for use with a photoelectric transducer of the type comprising a light source having a brightness parameter, a shutter and a single photosensor having a sensitivity parameter illuminated by light from said source, said apparatus comprising: optical means for dividing light from said source into two beams and for directing only one of said beams along a first path through said shutter to said photosensor and only the other of said beams along a second path through chopper means to said photosensor; the position of said shutter being a function of a variable to be measured for varying the amount of light in said one of said beams impinging upon said photosensor as a function of said variable to produce a DC component related to said variable in the output of said photosensor; said chopper means periodically interrupting only the other beam of light from said source to produce an AC component in the output of said photosensor, the magnitude of said AC component being a function of said light source brightness parameter and said photosensor sensitivity parameter; circuit means for separating said AC component from the output of said photosensor; and control means coupled to receive said separated AC component for adjusting one of said parameters in response to said AC component for maintaining said AC component at a constant magnitude.

2. An apparatus as defined in claim 1 wherein said control means comprises means for controlling the brightness parameter of said light source.

3. An apparatus as defined in claim 1 wherein said optical means comprises first lens means for said first path and second lens means for said second path, said first and second lens means being contiguous and said first and second paths being substantially parallel.

4. An apparatus as defined in claim 3 wherein said first lens means has a flat face parallel to said paths and said second lens means has a flat face parallel to said paths and to said flat face of said first lens means, said second lens means being mounted with said flat face of said second lens means abutting against said flat face of said first lens means.

5. An apparatus as recited in claim 4, wherein one of said flat faces is covered with a layer of light absorbing material.

6. An apparatus as recited in claim 4, wherein said first lens means is provided with a hole perpendicular to said first path and said flat face of said first lens means and wherein said shutter is positioned within said hole.

7. An apparatus as recited in claim 6, wherein said hole extends to said flat face of said first lens means, said second lens means is provided with a hole from said flat face of said second lens means aligned with said hole in said first lens means, and said shutter has a portion impervious to light in said hole in said second lens means.

8. An apparatus as recited in claim 7, wherein said shutter comprises a fixed tube, having a first portion with diametrically opposed slits in said hole within said first lens means and a second solid, unslit portion within said hole within said second lens means, and a movable tube having a portion with corresponding diametrically opposed slits within said first portion of said stationary tube.

9. An apparatus as defined in claim 3, wherein said second lens means has a focal plane and wherein said chopper means comprises a vibrating vane situated in said focal plane of said second lens means.

10. An apparatus as defined in claim 3, wherein said first lens means focuses the light in said first path on said shutter.

11. An apparatus as recited in claim 10, wherein said second lens means focuses the light in said second path on said chopper means.

12. A chopper-stabilized transducer including means positionally displaceable in response to external conditions, comprising: a single photosensor having a sensitivity parameter; a source of light having a brightness parameter; optical means providing first and second substantially straight, parallel paths between said source and said photosensor; movable shutter means disposed in said first path and coupled to said displaceable means for setting thereby for varying the amount of light incident on said photosensor in response to such external conditions for translation into a DC output component; chopper means disposed in said second path for causing a periodic variation in the amplitude of light incident on said photosensor for translation into an AC output component, the magnitude of said AC component being a function of said light source brightness parameter and said photosensor sensitivity parameter; circuit means for separating said AC component from the output of said photosensor; circuit means for separating said DC component from the output of said photosensor to provide an output voltage for indicating the setting of said movable shutter means; and means coupled to receive said separated AC component for adjusting one of said parameters in response to said AC component for maintaining said AC output component at a constant magnitude whereby, for any given setting of said shutter means, the magnitude of said DC output component is constant.

13. A transducer as defined in claim 12, wherein said means positionally displaceable comprises a diaphragm displaceable in response to variations in an external pressure.

14. A pressure sensor comprising, in combination: a diaphragm displaceable in response to variations in an external pressure; a source of light having a brightness parameter; lens means for directing said light along two paths; shutter means cooperating with said diaphragm for setting thereby for attenuating said light in one of said paths; chopper means for periodically interrupting said light in the other of said paths; a photosensor having a sensitivity parameter for receiving light at the end of both said paths for providing a DC output component proportional to the position of said diaphragm and an AC output component having a magnitude indicative of the brightness parameter of said source and the sensitivity parameter of said photosensor; circuit means for separating said DC component and said AC component from the output of said photosensor; control means coupled to receive said separated AC component for adjusting one of said parameters in response to said AC component for maintaining said AC output component at a constant magnitude whereby, for any given setting of said shutter means, the magnitude of said DC output component is constant.

15. A pressure sensor defined in claim 14 wherein said paths are parallel and said lens means focuses the light in said one path on said shutter means and the light in said other path on said chopper means.